July 29, 1952
F. P. LOBBAN
2,605,212
PROCESS FOR REMOVING PHENOLS AND MERCAPTANS
FROM LIGHT PETROLEUM DISTILLATES
Filed Jan. 24, 1949
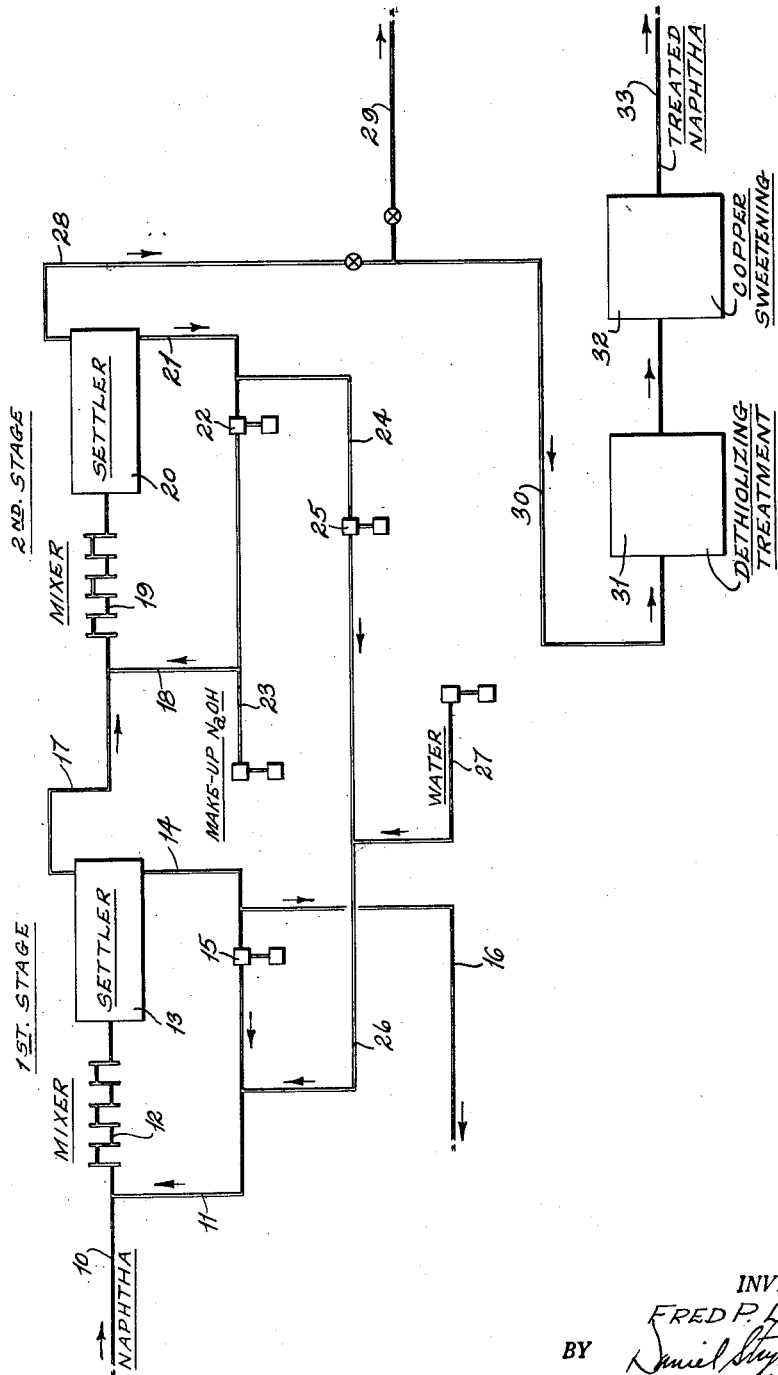
INVENTOR.
FRED P. LOBBAN
BY
ATTORNEYS Patented July 29, 1952

2,605,212

UNITED STATES PATENT OFFICE 2,605,212

PROCESS FOR REMOVING PHENOLS AND MERCAPTANS FROM LIGHT PETROLEUM DISTILLATES

Fred P. Lobban, Glen Ridge, N. J., assignor to The Texas Company, New York, N. Y., a corporation of Delaware Application January 24, 1949, Serial No. 72,410

4 Claims. (Cl. 196—32)

This invention relates to the treatment of hydrocarbons containing phenolic compounds such as alkyl phenols and also to the treatment of hydrocarbons containing both phenols and sulfur compounds. The invention is adapted for the treatment of light hydrocarbons such as gasoline, naphtha and kerosene. Light distillates such as gasoline produced by either thermal or catalytic cracking frequently contain considerable quantities of phenols as well as mercaptans and the invention is especially adapted for treating such distillates.

In applying to phenol-containing stocks the regenerative methods of mercaptan removal such as treating with an alkali metal hydroxide, with or without a so-called solutizer, it is frequently desirable to first reduce the phenolic content of the stock. The removal of the phenols can be accomplished by treating with a strong hydroxide solution. The difficulty is that the presence of the phenolates in the strong hydroxide increases the viscosity of the solution with the result that when the hydroxide is only partially spent the viscosity becomes very high, leading to emulsion formation and pumping and settling difficulties. Although the use of two or more stages can be employed with the strong caustic to give a high degree of phenol removal, the number of stages has no effect on the limit to which the caustic can be spent before its viscosity becomes a critical factor. Weaker caustic solutions can be nearly completely spent without attaining excessive viscosity but will not effect as complete a removal of phenols as the stronger solutions.

In accordance with the invention the hydrocarbon is passed successively through two zones of treatment with alkali metal hydroxide. In the second zone the hydrocarbon is contacted with a strong alkali metal hydroxide solution and used treating solution from this zone is diluted with water and contacted with the hydrocarbon in the first zone. In this way the phenol content of the hydrocarbon is reduced to the desired extent without undesirably increasing the viscosity of the treating solution. The hydrocarbon thus treated may then be subjected to further treatment, such as with an alkali metal hydroxide either with or without a so-called solutizer, to effect a reduction in the mercaptan content.

A method for the removal of mercaptans has come into use in which phenols are utilized as the solutizer, i. e., to increase the solubility of the mercaptans in the treating solution. The present invention provides an improvement on such process. By treating the hydrocarbon in the two zones, contacting the hydrocarbon in the first zone with the diluted hydroxide from the second zone and contacting it in the second zone with the strong hydroxide, the phenol content may be reduced to the equilibrium quantity obtaining in the subsequent treatment with alkali metal hydroxide with phenol as the solutizer. The invention is thus adapted particularly for the treatment of stocks having a phenol content in excess of the equilibrium quantity required in the subsequent sweetening or dethiolizing process.

"Equilibrium" is the condition at which there is no longer any transfer of phenols from the hydrocarbon to the treating reagent. The equilibrium quantity may be defined as that concentration of the phenol in the hydrocarbon which forms a constant ratio with some function of the phenol concentration of the treating solution, this ratio being known as the distribution coefficient. The concentrations of alkali and phenol in the second zone are controlled by the addition of fresh alkali and withdrawal of used alkali so that the effluent hydrocarbon has the predetermined equilibrium quantity of phenol.

For the purpose of more fully disclosing the invention reference is had to the accompanying flow diagram which illustrates a particular embodiment of the invention.

Charging stock, such as a naphtha stock containing phenols, is continuously charged to the system through a charging line 10 and is mixed with a sodium hydroxide solution, introduced through line 11, which has been prepared as is hereinafter explained. The mixture of naphtha and reagent is passed through a tubular mixing device 12 wherein the naphtha is intimately contacted with the reagent. The products undergoing reaction are delivered to a settling tank 13 wherein the caustic solution settles from the treated naphtha. The caustic is withdrawn from the tank through a line 14 and is continuously recycled by circulating pump 15 through line 11 to be commingled with the naphtha charge to the mixer, a portion of the spent caustic being systematically withdrawn from the system through a line 16.

The naphtha thus treated in the first stage flows through line 17 to the second stage wherein it is mixed with a caustic soda solution introduced through line 18. The mixture is passed through a tubular mixing device 19 wherein the naphtha and reagent are intimately commingled. The products undergoing reaction pass to a settling tank 20 wherein the reagent settles from the naphtha. The settled reagent is withdrawn from the tank through a line 21 and is continuously recycled by circulating pump 22 through line 18 for contacting with the stream of naphtha flowing to the mixer 19. Make-up sodium hydroxide which may be fresh solution or regenerated solution or a mixture of both, is added as may be required through line 23.

A portion of the caustic solution withdrawn from settling tank 20 through line 21 is systematically withdrawn from the circuit through a line 24 and is injected by a pump 25 through a line 26 into the caustic soda circuit of the first stage. This caustic solution which is transferred from the second stage to the first stage is diluted with water introduced through line 27.

The caustic soda which is charged to the second stage through line 23 is a strong solution such as 4-Normal and higher. A large portion of the phenol content will have been removed from the naphtha in the first stage, for example, ordinarily about half of the phenol content. But even more important as a feature limiting the build-up of phenolates in the caustic solution in the second stage is the systematic withdrawal of a portion of the caustic solution from the circuit of the second stage through line 24. The increase in viscosity of the caustic solution circulating in the second stage is thus limited so that pumping and settling difficulties are avoided.

The caustic solution withdrawn from the second stage after being diluted with water constitutes the treating reagent of the first stage. This weak caustic solution can be repeatedly recycled until it is practically spent without attaining excessive viscosities. A portion of the weak caustic circulating in the first stage is systematically rejected through the line 16 at a rate equal to the sum of the water and strong caustic make-up rates.

The concentrations of caustic and phenol in the second stage are controlled by the addition of make-up caustic introduced through line 23 and the withdrawal of used caustic through line 24 so that the treated naphtha will have the predetermined equilibrium quantity of phenol. The effluent naphtha flows from the settling tank 20 through a line 28. The two-stage treatment with the alkaline solution will remove acidic bodies, hydrogen sulfide, carbon dioxide and the like, which may be contained in the hydrocarbon charge. This treatment will also, to a certain extent, remove mercaptans, particularly the lower molecular weight mercaptans. In the event that the two-stage treatment has satisfactorily treated the naphtha so that no further treatment for the removal of mercaptans is desired, the treated product may be removed from the system through a line 29.

Generally, however, the two-stage treatment will not completely remove the mercaptans and produce a sweet product and in such cases the treated naphtha from the second stage is directed through a line 30 to a treating step 31 in which the naphtha is subjected to any suitable dethiolizing or sweetening process. This step is advantageously conducted by treatment with an alkali metal hydroxide, usually preferably potassium hydroxide, and with the aid of a so-called solutizer. Various substances have been used as addition agents to the alkaline treating solution for the purpose of modifying the distribution coefficient of the treating solution, such for example as isobutyric acid, and various alcohols. When solutizers of such nature are employed it is generally desirable to conduct the treatment in the two precedent stages described so that the phenol content of the naphtha will be reduced to a minimum before being subjected to the solutizer treatment.

When using phenol as the solutizer the precedent treatment is controlled, as has been explained, so that the naphtha directed to the solutizer treatment will contain the equilibrium concentration of phenol which is characteristic of the finished naphtha as a result of the treatment by the phenol solutizer reagent. The naphtha containing this equilibrium concentration of phenol is contacted in step 31 with an alkali metal hydroxide, preferably potassium hydroxide, with added phenol as the solutizer. This phenol may be phenol recovered from the spent alkaline solution discharged through line 16 or it may be obtained from any other suitable source. When using the phenol solutizer in step 31 it is not necessary to adjust the phenol concentration of the reagent since it does not vary. The pretreated naphtha contains the equilibrium quantity of phenols from the pretreatment which is the same equilibrium quantity of phenols as is contained in the effluent naphtha from the solutizer treatment in step 31. The treatment of the naphtha in step 31 with the alkaline solution including the solutizer is conducted in a well-known manner, preferably with regeneration of treating solution and recycling of regenerated reagent. The regeneration by steaming or oxidation removes mercaptides from the treating solution but does not affect the phenols.

In the case of cracked naphthas it is extremely difficult to effect the removal of the last traces of mercaptans and it is frequently, although not always, necessary to give the naphtha a further treatment in order to produce a product capable of standing the doctor test. For this purpose the naphtha which has been treated in step 31 is passed to a further treating step 32 wherein it may be subjected to the well-known copper sweetening process such as being percolated through copper chloride or treated with a slurry of copper chloride. The treated product is withdrawn from the system through line 33.

In describing the two-stage treatment for the removal or control of the phenol content of the hydrocarbon, each stage has been shown to embody a single unit comprising a tubular mixer and a settling tank. It is to be understood that if desired the mixer and settler of each stage may be pluralized so that each stage will embody a plurality of successive mixers and settlers. Although it will generally be found more enomomical to provide a single unit for each stage, in some cases there is a distinct advantage in having a second unit in one of the stages. For example, when it is desired to completely remove the phenols from the hydrocarbon the strong caustic stage may consist of two units with the first unit operating in the manner described herein for the mixer 19 and settler 20 to effect removal of the major portion of the phenols. The effluent hydrocarbon from this unit is then contacted with a sufficient concentration of alkaline solution in a second unit to accomplish substantially complete removal of the phenols. As a result of the precedent treatment in the first stage and in the first unit of the second stage, the concentration of phenols in the final unit will be so small that there will be practically no danger of building up excessive viscosities in this final unit.

In lieu of using the tubular mixer and settling tank arrangement the process may be practiced in a plurality of towers or in a single tower with countercurrent contacting of the reagent and hydrocarbon. When using the single tower the water is injected at an intermediate point in the tower, the tower being preferably provided with a plurality of input lines so that the water may be introduced at the exact point desired for dilution. In the countercurrent method the operation may be conducted so as to withdraw from the top of the tower a product which contains substantially no phenols or which contains the equilibrium quantity of phenols which may be required in the subsequent phenol solutizer treating step.

The rates of water injection and reagent withdrawal from each stage, the strengths of the alkali metal hydroxide solutions and the degree to which the phenols are removed depend on the phenol content of the hydrocarbon and the equilibrium contents of the naphtha and the hydroxide solutions in the succeeding mercaptan removal or sweetening step. In reference to the alkali metal hydroxide employed in the several steps of the complete process described herein, it may be stated that generally it will be found that potassium hydroxide is somewhat more effective than sodium hydroxide but the latter on account of its cheaper cost will usually be found more satisfactory for the pretreating or phenol control step.

In making a comparison between the method of controlling the phenol content in accordance with the invention embodying the feature of water dilution of the hydroxide for the primary stage and a two-stage countercurrent operation without such dilution, the comparison was applied to the treatment of a thermally cracked naphtha having a phenol content of 3000 p. p. m. (parts per million). The calculations were based on a reduction in phenol content to 100-300 p. p. m. and on the use of 6 N caustic soda. In the method with water dilution for the first stage the maximum allowable viscosity of the caustic solutions employed was set at 10 centistokes at 100° F. which is considered a safe limit on the viscosity for avoiding emulsion and settling difficulties. However, in order that the caustic in the two-stage system without dilution would be strong enough to equal the extraction efficiency of the dilution method, it was found that the spent caustic would have a viscosity of 20 centistokes at 100° F. The comparison showed that the method with water dilution was much greater in caustic efficiency than the method without dilution, the method with dilution in accordance with the invention requiring 0.317 of a pound NaOH per barrel of naphtha while the method without dilution required 0.532 of a pound NaOH per barrel of naphtha.

Although a preferred embodiment of the invention has been described herein, it will be understood that various changes and modifications may be made therein, while securing to a greater or less extent some or all of the benefits of the invention, without departing from the spirit and scope thereof.

I claim:

1. The method of treating hydrocarbons for the removal of phenols that comprises passing the hydrocarbons successively through primary and secondary treating zones, contacting the hydrocarbons in the second zone with a solution of alkali metal hydroxide having a concentration of at least 4 Normal under conditions to effect removal of phenols from the hydrocarbons, withdrawing from the second zone used hydroxide solution containing the resultant phenolates, diluting it with water to reduce the viscosity thereof and contacting the hydrocarbons in the primary treating zone with the diluted solution under conditions to effect removal of phenols from the hydrocarbons.

2. The method of treating hydrocarbons containing phenols and mercaptans that comprises passing the hydrocarbons successively through primary and secondary treating zones to effect a controlled removal of phenols and then passing the hydrocarbons to a third treating zone for the removal of mercaptans, contacting the hydrocarbons in the second zone with a solution of alkali metal hydroxide having a concentration of at least 4 Normal under conditions to effect removal of phenols from the hydrocarbons, withdrawing from the second zone used hydroxide solution containing the resultant phenolates, diluting it with water to reduce the viscosity thereof, contacting the hydrocarbons in the first zone with the diluted hydroxide solution under conditions to effect removal of phenols from the hydrocarbons, and contacting the hydrocarbon in the third stage with a dethiolizing reagent to effect removal of mercaptans.

3. The method of treating hydrocarbons containing phenols and mercaptans that comprises passing the hydrocarbons successively through primary and secondary treating zones to effect a controlled removal of phenols and then passing the hydrocarbons to a third treating zone wherein the hydrocarbons are subjected to a solutizer treatment for the removal of mercaptans, contacting the hydrocarbon in the second zone with a solution of alkali metal hydroxide having a concentration of at least 4 Normal under conditions to effect removal of phenols from the hydrocarbons, controlling the concentrations of alkali and phenol in the second treating zone by charging fresh alkali metal hydroxide thereto and withdrawing used hydroxide containing the resultant phenolates therefrom at correlative rates to maintain in the treated hydrocarbons the equilibrium quantity of phenol required for the third treating zone, diluting the withdrawn hydroxide with water to reduce the viscosity thereof, contacting the hydrocarbons in the first zone with the diluted hydroxide from the second zone under conditions to effect removal of phenols from the hydrocarbons, withdrawing from the second zone the hydrocarbons having the phenol content equivalent to the equilibrium quantity required for the treatment in the third zone and contacting said hydrocarbons in the third zone with an alkali metal hydroxide solution containing phenol solutizer to effect the removal of mercaptans.

4. The method of treating hydrocarbons for the removal of phenols that comprises passing the hydrocarbons successively through primary and secondary treating zones, contacting the hydrocarbons in the secondary treating zone with a solution of alkali metal hydroxide having a concentration of at least 4 Normal under conditions to effect removal of phenols from the hydrocarbons, maintaining the hydroxide in cyclic flow therein, withdrawing from said cyclic flow used hydroxide solution containing the resultant phenolates, diluting the withdrawn hydroxide solution with water to reduce the viscosity thereof, directing the diluted hydroxide solution to the primary treating zone, maintaining a cyclic flow of the diluted hydroxide solution therein, bringing the hydrocarbons into contact therewith in the primary treating zone under conditions to effect removal of phenols and withdrawing used hydroxide from the latter cycle.

FRED P. LOBBAN.

REFERENCES CITED

The following references are of record in the file of this patent:

UNITED STATES PATENTS

| Number | Name | Date |
|---|---|---|
| 2,213,801 | Frolov | Sept. 3, 1940 |
| 2,219,109 | McCormick | Oct. 22, 1940 |
| 2,306,843 | Reed | Dec. 29, 1942 |
| 2,347,515 | Schmidt | Apr. 25, 1944 |